3,652,772
2-HYDROXY-3-METHOXY-β-NITROSTYRENE AND 2-HYDROXY - 5 - β-NITROSTYRENE AS ANTI-FUNGAL AND ANTIBACTERIAL AGENTS
Glentworth Lamb, Trenton, N.J., assignor to American Cyanamid Company, Stamford, Conn.
No Drawing. Filed Jan. 6, 1969, Ser. No. 789,386
Int. Cl. A01n 9/20
U.S. Cl. 424—340
8 Claims

ABSTRACT OF THE DISCLOSURE

A novel method for protecting growing plants from attack by plant pathogenic fungi is given whereby an effective amount of a compound selected from the group consisting of 2-hydroxy-3-methoxy-beta-nitrostyrene and 2-hydroxy-5-methoxy-beta-nitrostyrene is applied to said plants.

---

This invention relates to a novel method of pest control. More particularly it is directed to compositions and methods for using these compositions which are suitable for controlling various harmful organisms which commonly infest and attack plants.

It is well known that the class of compounds known as nitroethylenes which are in general obtained by a condensation of aldehydes and ketones with a nitro compound containing a nitromethyl group, are toxic to a wide variety of organisms such as bacteria, fungi and other physiologically harmful lower forms of life.

Compounds containing the nitroethylene group

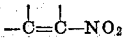

are effective in controlling one or more types of organisms through toxicity and specifically vary considerably according to the nature of the substituent groups attached to the nitroethylene group. The antifungal activity of beta-nitrostyrene and certain derivatives thereof was disclosed some twenty-five years ago by E. W. Boquist et al. in United States Pat. 2,335,384. Since that time a number of publications by various authors have appeared in the literature reporting methods for the preparation of beta-nitrostyrene and derivatives thereof and the activity of such compounds against bacteria, fungi, and mycotoxicosis.

While the literature references suggest that a considerable effort has been made to develop beta-nitrostyrene and its derivatives as useful compositions in a variety of fields of interest, it is surprising to find that these compounds have been unable to reach commercial acceptance in the area of antifungal activity. This may be explained in part by the fact that beta-nitrostyrene is a powerful sternutator and lachrymator in man and thus being an irritant, is subject to many handling problems. Additionally, it should be noted that available data have indicated that compounds containing the nitroethylene group are injurious to living plants as well as to the organisms above. Moreover, although data suggest that certain derivatives of nitrostyrene are antifungal, it has been found that these derivatives are either ineffective when used in agriculture for the protection of living plants or phytotoxic when applied to plants at rates sufficient to control plant pathogenic organisms.

It is, therefore, a primary object of this invention to provide a novel method of protecting plants from pathogenic organisms. Another object is to provide a novel method of protecting living as well as non-dormant living plants from attack by plant pathogenic bacteria and fungi. Another object is to provide a novel use for heretofore rarely used derivatives of beta-nitrostyrene. Other objects and advantages will become apparent through the following description.

It has been surprisingly found that growing plants may be effectively protected from pathogenic fungi and bacteria by applying an effective amount of 2-hydroxy-3-methoxy-beta-nitrostyrene, 2-hydroxy-5-methoxy-beta-nitrostyrene, or mixtures thereof to the surface of the plants which are to be protected.

In accordance with the present invention, 2-hydroxy-3-methoxy-beta-nitrostyrene and 2-hydroxy-5-methoxy-beta-nitrostyrene can be prepared in any conventional manner. One such way is to react 2-hydroxy-3-methoxybenzaldehyde with nitromethane in the presence of ammonium acetate and acetic acid. More specifically, a solution of freshly distilled 2-hydroxy-3-methoxybenzaldehyde, nitromethane, and ammonium acetate in glacial acetic acid may be refluxed for a period of approximately two hours. The cooled dark mixture can then be poured into water and the gummy product allowed to crystallize. The crude solid may then be recrystallized from benzene with the aid of activated charcoal. The product, yellow crystalline needles, is 2-hydroxy-3-methoxy-beta-nitrostyrene. In a similar manner the positional isomer, 2-hydroxy-5-methoxy-beta-nitrostyrene, can be prepared by substituting 2-hydroxy-5-methoxybenzaldehyde for 2-hydroxy-3-methoxybenzaldehyde in the above reaction.

Although the compounds of the invention can be used for the treatment of seeds and dormant plants, they are unique in comparison to closely related members of their family in that they may also be employed in the treatment of non-dormant plants.

While beta-nitrostyrene and a number of derivatives thereof, including 4-hydroxy-3-methoxy-beta-nitrostyrene which is another positional isomer of the compounds of the present invention, were said to be fungicidal and have been suggested for use in the control of fungus diseases in living plant matter, in practice such compounds have been found to be too phytotoxic at fungitoxic rates to permit their use on growing plants. It was therefore surprising to discover that 2-hydroxy-3-methoxy-beta-nitrostyrene and its position isomer, 2-hydroxy-5-methoxy-beta-nitrostyrene, are highly effective fungicides and non-phytotoxic at as much as seventeen times the effective rate of application.

These compounds are generally applied to growing plants in admixture with liquid or solid diluents and at sufficient amounts to provide approximately 0.25 to about 8.0 pounds per acre and, more preferably, 0.5 to 2.0 pounds per acre, of active ingredient. Somewhat higher rates may be used to combat serious fungus infestations, but substantially higher rates usually are not required. The compounds of this invention are readily formulated as dusts, dust concentrates, wettable powders, or liquid concentrates which lend themselves to application with conventional spraying or dusting equipment.

Dusts and dust concentrates are usually prepared by blending about 2 to about 25% by weight of active ingredient, 2-hydroxy-3-methoxy-beta-nitrostyrene or 2-hydroxy-5-methoxy-beta-nitrostyrene, with about 75 to 98% by weight of a finely divided solid diluent such as attapulgite, kaolin, talc, diatomaceous earth, or the like. Wettable powders are made in much the same manner by blending about 25 to about 75% by weight of active ingredient, 2-hydroxy-3-methoxy-beta-nitrostyrene or 2-hydroxy-5-methoxy-beta-nitrostyrene, with about 1 to about 3% by weight of a wetting agent. The remainder of the formulation is a finely divided solid such as mentioned above. These formulations are then generally dispersed in water in sufficient amounts to provide approximately 0.06 to 2.0 pounds of active ingredient per 100 gallons of water and are applied at a rate of from about 25 to about 400 gallons per acre. The 0.06 and 2.0 pounds per 100 gallon rates are equivalent to about 72 p.p.m. and 2400 p.p.m. of active ingredient. Liquid concentrates may be prepared by dissolving the active ingredient in an organic solvent such as lower alkyl alcohols or ketones such as methanol, ethanol, propanol, methyl isobutyl ketone, cyclohexanone or the like with or without the addition of surfactants, spreaders, stickers, emulsifiers, or the like. For application, these concentrates are normally diluted with water or an inexpensive organic solvent such as deodorized kerosene and applied with conventional spraying equipment.

In order that the present invention may be more fully understood, the following examples are set forth by way of illustration. No specific details or enumerations contained therein should be construed as limitations on the present invention excepting so far as they appear in the appended claims.

EXAMPLE 1

In this example 2-hydroxy-5-methoxy-beta-nitrostyrene is prepared. A mixture of 0.33 mole or 50 grams of 2-hydroxy-5-methoxybenzaldehyde, 50 milliliters of nitromethane, and 40 grams of ammonium acetate is refluxed in 200 milliliters of glacial acetic acid for two hours. The reaction mixture is then poured over 1.5 liters of ice and water and subsequently 49.2 grams of a red solid product is collected and dried. Chromatography on an acid alumina column with acetone as eluent gives an orange-yellow solid product of 2-hydroxy-5-methoxy-beta-nitrostyrene which has a melting point of 151° C.

EXAMPLE 2

The procedure of Example 1 was followed to produce 2-hydroxy-3-methoxy-beta-nitrostyrene except that 2-hydroxy-3-methoxybenzaldehyde was substituted for 2-hydroxy-5-methoxybenzaldehyde.

EXAMPLE 3

The phytoxicity and fungitoxicity of 2-hydroxy-3-methoxy-beta-nitrostyrene when compared to beta-nitrostyrene was determined. Flats containing Early Marketer variety of cucumbers in the 2-true leaf stage were sprayed to "run-off" with concentrations of 37.5, 75, 150, 300, and 600 p.p.m. of the test compounds in 50 parts acetone and 50 parts water solution. When the spray deposits were dry, the plants were inoculated with a conidial suspension of cucumber anthracnose (*Colletotrichum lagenarium*) by spraying. Inoculated plants were immediately placed in a constant temperature box which maintained a temperature of 62° F. in a moisture-saturated atmosphere. The 62° F. temperature was maintained for 24 hours and then raised to 70° F. for a 48 hour period. At the end of this time, the flats were removed to the greenhouse and 48 hours later the results which are shown in Table I below were observed.

TABLE I

| Concentration (p.p.m.) | 37.5 | 75 | 150 | 300 | 600 |
|---|---|---|---|---|---|
| Phytotoxicity: | | | | | |
| β-Nitrostyrene | N | N | D | D | D |
| 2-hydroxy-3-methoxy-β-nitrostyrene | N | N | N | N | N |
| Disease control: | | | | | |
| β-Nitrostyrene | 1 | 2 | (*) | (*) | (*) |
| 2-hydroxy-3-methoxy-β-nitrostyrene | 5 | 5 | 5 | 5 | 5 |

*=No rating—plants dead.

Disease control ratings.—5=Clean (no disease); 4=Trace disease; 3=Moderate disease; 2=Severe disease; 1=No control over disease; N=Normal; D=Dead.

From these data it is evident that beta-nitrostyrene is ineffective for controlling *Colletotrichum lagenarium* when applied at 75 p.p.m. to cucumber plants and is highly phytotoxic when applied at 150 and higher p.p.m., whereas 2-hydroxy-3-methoxy-beta-nitrostyrene is shown to be highly effective for controlling the fungus when applied at rates as low as 37.5 p.p.m. and was shown to be non-phytotoxic when applied at rates as high as 600 p.p.m.

EXAMPLE 4

To test the fungitoxity of 2-hydroxy-3-methoxy-beta-nitrostyrene, 2-hydroxy-5-methoxy-beta-nitrostyrene, and 2-hydroxy - 3 - methoxy - beta - methyl - beta - nitrostyrene against cucumber anthracnose, *Colletotrichum lagenarium*, and tomato late blight, *Phytophthora infestans*, flats containing Early Marketer type cucumbers and Bonny Best tomatoes were treated with rates of 125, 62.5 and 31.25 p.p.m. of the test compounds in 50 parts acetone and 50 parts water solution. The test procedures employed were similar to those used in Example 2 and the results are reported in Table II below.

TABLE II.—DISEASE RATINGS[1]

| | Cucumber anthracnose | | | Tomato late blight | | |
|---|---|---|---|---|---|---|
| Concentration (p.p.m.) | 125 | 62 | 31 | 125 | 62 | 31 |
| 2-hydroxy-3-methoxy-β-nitrostyrene | 5 | 5 | 5 | 5 | 5 | 4 |
| 2-hydroxy-5-methoxy-β-nitrostyrene | 5 | 4 | 3 | 5 | 3 | 2 |
| 2-hydroxy-3-methoxy-β-methyl-β-nitrostyrene | 3 | 1 | 0 | 2 | 1 | 0 |

[1] Disease control ratings.—5=Clean (no disease); 4=Trace; 3=Slight; 2=Moderate; 1=Severe; 0=Like controls.

An examination of these data show that 2-hydroxy-3-methoxy-beta-nitrostyrene and 2-hydroxy-5-methoxy-beta-nitrostyrene are vastly superior to the homolog 2-hydroxy-3-methoxy - beta - methyl-beta-nitrostyrene as antifungal agents for the control of anthracnose and late blight on cucumbers and tomatoes, respectively.

EXAMPLE 5

Following the procedures of Example 2, the fungitoxic and phytotoxic effects of 2-hydroxy-5-methoxy-beta-nitrostyrene, 3-methoxy-beta-nitrostyrene, 4-methoxy-beta-nitrostyrene, 3,4-methylenedioxy-beta-nitrostyrene, and 4-hydroxy-3-methoxy-beta-nitrostyrene against cucumber anthracnose, *Colletotrichum lagenarium*, on Early Marketer type cucumbers and late tomato blight, *Phytophthora infestans*, on Bonny Best type tomatoes were determined. Again the test compounds, in a 50 parts acetone, 50 parts water solution were applied at 100 and 500 p.p.m. concentrations, and 2-hydroxy-5-methoxy-beta-nitrostyrene was also applied at 1000 p.p.m. in both treatments. Application of test compounds, inoculations of plants with disease organisms, incubation and evaluations were made in accordance with the procedures of Examples 3 and 4. The results appear in Table III below.

TABLE III

| | Cucumber anthracnose | | Late tomato blight | |
|---|---|---|---|---|
| Compound—concentration (p.p.m.) | 500 | 100 | 500 | 100 |
| 2-hydroxy-5-methoxy-β-nitrostyrene | 5 | [1]5 | 5 | [1]5 |
| 3-methoxy-β-nitrostyrene | D | 3 | D | 4 |
| 4-methoxy-β-nitrostyrene | D | 1 | 1 | 4 |
| 3,4-methylenedioxy-β-nitrostyrene | 1 | 2 | (*) | (*) |
| 4-hydroxy-3-methoxy-β-nitrostyrene | 1 | 1 | (*) | (*) |

[1] 125 p.p.m.
*=No test.

Disease ratings.—5=Clean of disease; 4=Trace disease; 3=Moderate disease; 2=Severe disease; 1=No control over disease; D=Dead.

It should be noted that 2-hydroxy-5-methoxy-beta-nitrostyrene, which was applied at the 1000 p.p.m. in both treatments, was found to be completely effective (i.e., rated 5 below) and non-phytotoxic.

When these data are compared with the data obtained in the tests reported in Examples 3 and 4 above, it is clearly evident that 2-hydroxy-3-methoxy-beta-nitrostyrene is vastly superior to its positional isomers and homologs as an antifungal agent for the control of anthracnose and late blight on cucumbers and tomatoes, respectively. Further, it is found that 3-methoxy-beta-nitrostyrene, 4-methoxy-beta-nitrostyrene and 3,4-methylenedioxy-beta-nitrostyrene are phytotoxic at 500 p.p.m. concentration whereas 2-hydroxy-5-methoxy-beta-nitrostyrene is not phytotoxic at 1000 p.p.m. as noted above in the same tests.

EXAMPLE 6

To test the antifungal activity of 2-hydroxy-3-methoxy-beta-nitrostyrene against apple scab, *Venturia inae-*

*qualis*, the compound was made up at concentrations of 1200 and 600 p.p.m. in again a 50 parts acetone, 50 parts water solution. The mixture was sprayed on the foliage of apple seedlings about 12 inches high potted in 4 inch clay pots. When the spray deposits had dried, the treated trees and controls were inoculated with a conidial suspension of apple scab from infested apple leaves.

The trees were then placed in a constant temperature box at 72° F. with a moisture-saturated atmosphere. 18 days later it was observed that neither the tree treated with 600 p.p.m. nor the tree treated with 1200 p.p.m. of the 2-hydroxy-3-methoxy-beta-nitrostyrene showed any trace of disease or phytotoxity.

EXAMPLE 7

To determine the antibacterial activity of 2-hydroxy-3-methoxy-beta-nitrostyrene, 100 p.p.m. of the test compound in sterile deionized water was placed in three separate sterile test tubes. One tube was inoculated with a 24-hour broth culture of *Aerobacter aerogenes*, one with *Staphylococcus aureus*, and one with *Xanthomonas vesicatoria*. The tubes were held at room temperature for 24 hours at which time 1.1 milliliters of sterile 10% peptone broth was added to each tube aseptically. The tubes were then incubated for 24 hours at 37° C. At the end of this time the tubes were clear of turbidity so they were subcultured to clean broth to determine whether there was kill or stasis. After 24 hours, the results showed that *Aerobacter aerogenes* was killed, *Staphylococcus aureus* was stasis and *Xanthomonas vesicatoria* was killed.

While this invention has been discussed and described in conjunction with various preferred embodiments, it is to be understood that the invention is not to be solely limited thereto but is construed and restricted only by the appended claims.

I claim:

1. A method for protecting living plants from attack by plant pathogenic bacteria and fungi comprising contacting said plants with an effective amount of a compound selected from the group consisting of 2-hydroxy-3-methoxy-beta-nitrostyrene and 2-hydroxy-5-methoxy-beta-nitrostyrene.

2. A method according to claim 1 wherein said compound is applied at the rate of about 0.25 lb. to 8 lbs./acre.

3. A method according to claim 1 wherein said compound is applied at 0.5 to 2 lbs./acre.

4. A method for protecting non-dormant living plants from attack by plant pathogenic bacteria and fungi comprising contacting said plants with an effective amount of a compound selected from the group consisting of 2-hydroxy-3-methoxy-beta-nitrostyrene and 2-hydroxy-5-methoxy-beta-nitrostyrene.

5. A method according to claim 4 wherein the compound is 2-hydroxy-3-methoxy-beta-nitrostyrene and is applied at the rate of about 0.25 to 8 lbs./acre.

6. A method according to claim 5 wherein said compound is applied at 0.5 to 2 lbs./acre.

7. A method according to claim 4 wherein the compound is 2-hydroxy-5-methoxy-beta-nitrostyrene and is applied at the rate of about 0.25 to 8 lbs./acre.

8. A method according to claim 7 wherein said compound is applied at 0.25 to 2 lbs./acre.

References Cited

UNITED STATES PATENTS

| | | | |
|---|---|---|---|
| 2,223,142 | 11/1940 | Weirich | 424—348 X |
| 2,335,384 | 11/1943 | Bousquet et al. | 424—349 X |
| 2,795,555 | 6/1957 | Shumard | 424—349 X |

ALBERT T. MEYERS, Primary Examiner

L. SCHENKMAN, Assistant Examiner